United States Patent
Dang et al.

(10) Patent No.: US 6,285,641 B1
(45) Date of Patent: Sep. 4, 2001

(54) DEVICE FOR WRITING AND/OR READING OPTICAL RECORDING MEDIUM OF VARIOUS DESIGNS

(75) Inventors: Lieu Kim Dang; Friedhelm Zucker; Heinz-Jörg Schroeder, all of Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/142,268

(22) PCT Filed: Feb. 27, 1997

(86) PCT No.: PCT/EP97/00943
§ 371 Date: Sep. 3, 1998
§ 102(e) Date: Sep. 3, 1998

(87) PCT Pub. No.: WO97/34296
PCT Pub. Date: Sep. 18, 1997

(30) Foreign Application Priority Data

Mar. 12, 1996 (DE) .............................................. 196 09 575

(51) Int. Cl.[7] ...................................................... G11B 7/00

(52) U.S. Cl. ................................... 369/53.41; 369/53.22; 369/44.27

(58) Field of Search .............................. 369/44.27, 44.28, 369/44.29, 44.34, 44.35, 47, 48, 54, 58, 59, 112, 93, 94, 47.1, 47.15, 53.1, 53.11, 53.37, 53.41, 53.22, 53.2

(56) References Cited

U.S. PATENT DOCUMENTS

| | | | |
|---|---|---|---|
| 4,797,869 | 1/1989 | Hirano | 369/75.2 |
| 5,263,011 | 11/1993 | Maeda et al. | 369/44.27 |

FOREIGN PATENT DOCUMENTS

| | | |
|---|---|---|
| 0294490 | 12/1988 | (EP) . |
| 0414380 | 2/1991 | (EP) . |
| 0610055 | 8/1994 | (EP) . |
| 0712122 | 5/1996 | (EP) . |
| 0731457 | 9/1996 | (EP) . |
| 0767455 | 4/1997 | (EP) . |
| 0767456 | 4/1997 | (EP) . |

(List continued on next page.)

OTHER PUBLICATIONS (see AC) Patent Abstracts of Japan, vol. 016, No. 368, Aug. 7, 1992 & JP 4–113556 (Sony).
(see AH) Patent Abstracts of Japan, vol. 010, No. 338, Nov. 15, 1986 & JP 61–139982 (Canon Inc.).
(see AI) Patent Abstracts of Japan, vol. 011, No. 147, May 14, 1997 & JP 61–283035 (Matsushita Electric Ind Co. Ltd.).

(List continued on next page.)

Primary Examiner—Muhammad Edun
(74) Attorney, Agent, or Firm—Joseph S. Tripoli; Paul P. Kiel (57) ABSTRACT

A device for writing to and/or reading from optical recording media having different structures is described, for example, a device which is suitable both for writing to/reading from digital videodisks (DVD) and conventional CD's. Provision is made for measuring the intensity of each peak in the mirror signal while the objective lens is moving to the recording medium. The intensity e.g. at the instant of the positive-negative crossing of the focus error signal is taken in this case. The type of optical recording medium is determined from the time characteristic and/or the height distribution of the peaks. In order to identify the type of optical recording medium, different properties of the optical recording medium are taken into account, such as reflectivity of the corresponding reflective surface, reduced intensity modulation due to spherical aberration, time characteristic and the like.

24 Claims, 3 Drawing Sheets

FOREIGN PATENT DOCUMENTS

| | | |
|---|---|---|
| 61-139982 | 6/1986 | (JP) . |
| 61-283035 | 12/1986 | (JP) . |
| 63-285730 | 11/1988 | (JP) . |
| 4-113556 | 4/1992 | (JP) . |
| 5-054406 | 3/1993 | (JP) . |
| 5-258450 | 10/1993 | (JP) . |
| 63-02095 | 10/1994 | (JP) . |
| 8-287588 | 11/1996 | (JP) . |
| 8-306056 | 11/1996 | (JP) . |

OTHER PUBLICATIONS (see AJ) Patent Abstracts of Japan, vol. 095, No. 001, Feb. 28, 1995 & JP 06–302095 (Matsushita Electric Ind. Co. Ltd.).

(see AK) Patent Abstracts of Japan, vol. 017, No. 366, Jul. 9 1993 & JP 5–054406 (Matsushita Electric Ind. Co. Ltd.).

(see AL) Patent Abstracts of Japan, vol. 018, No. 028, Jan. 17, 1994 & JP 5–258450.

(see AN) Patent Abstracts of Japan, vol. 013, No. 108, Mar. 15, 1989 & JP 63–285730 (Hitachi Ltd.).

(see AQ) Patent Abstracts of Japan, vol. 097, No. 033, Mar. 31, 1997 & JP 8–287588 (Matsushita Electric Ind. Co. Ltd.

(see AR) Patent Abstracts of Japan, vol. 097, No. 003, Mar. 3, 1997 & JP 8–306056 (Sanyo Electric Co. Ltd.).

Anonymous: "Detection of Optical Disk Type" IBM Technical Disclosure Bulletin, vol. 29, No. 3, Aug. 1986, pp. 995–996.

DEVICE FOR WRITING AND/OR READING OPTICAL RECORDING MEDIUM OF VARIOUS DESIGNS

The present invention relates to a device for writing to and/or reading from optical recording media having different structures.

A device of this type is disclosed, for example, in EP 0 294 490 or "IBM Technical Disclosure Bulletin, Vol. 29, No. 3, August 1986". In these devices, the type of optical recording medium is determined using the reflectivity of the recording layer. In this case, the intensity of the reflected light is compared with two reference values, which permit a distinction (discrimination) between two types of recording media.

In the device disclosed in "IBM Technical Disclosure Bulletin, Vol. 29, No. 3, August 1986", the reflectivity of the optical recording medium is used to determine the type thereof. The objective lens of the device is in this case moved from a reset position towards the recording medium. The signal emitted by a focus detector during this process is used to determine the type of optical recording medium. Only those regions of the signal characteristic which lie above a first reference value (LOW) are used here. If the magnitude of the signal lies above the first reference value but below a second, higher reference value (HIGH), then an AND gate emits a pulse which signals that a "write-once" recording medium has been inserted. If the magnitude of the signal lies both above the first reference value and above the second, higher reference value (HIGH), then a further AND gate emits a pulse which signals that a "read-only" recording medium has been inserted. This method functions whenever the recording media used can be identified unambiguously using the reference values. A relatively large number of different types of optical recording media makes it necessary to introduce, if appropriate, additional reference values, which are inevitably closer together, as a result of which the error probability rises. If a plurality of extreme values lying between the lowest and the highest reference value appear in the signal characteristic, then the result in this method may be that a plurality of contradictory statements relating to a single recording medium are output concerning its type, which may result in the device malfunctioning.

EP 0 294 490 discloses, for the purpose of determining the type of optical recording medium, evaluating the signal level of the RF signal, that is to say of the signal carrying the information read from the recording medium. In this case, provision is made for evaluating the signal level whenever the objective lens is in a position suitable for reading, that is to say its focus point lies on or almost on the reflecting layer of the recording medium. As long as the type of optical recording medium is still unknown, the device cannot be set optimally, that is to say the RF signal is subjected to a greater or lesser extent to interference, with the result that the signal level can actually be evaluated only during a very brief time interval. Depending on the level of the randomly read signal, it is possible in this case for large fluctuations to occur, with the result that it is necessary to take a large error bandwidth into account, that is to say in this case, too, the problem arises that with a wide variety of different types of optical recording media having different thicknesses and/or numbers of layers which is to be expected in the future, the signal levels used for the discrimination are so close together that unambiguous discrimination requires ever greater complexity or even becomes impossible. Moreover, unambiguous discrimination may be rendered virtually impossible by production-dictated slight fluctuations in the reflectivity of the optical recording medium.

It must therefore be regarded as disadvantageous with these known devices that the wide variety of different types of optical recording media having different thicknesses and/or numbers of layers which is to be expected in the future can no longer be identified reliably by means of a simple reference value analysis according to the prior art.

Devices suitable for reading from and/or writing to different types of optical recording media, in particular, should be capable of identifying the type of optical recording medium in order to be able correctly to select parameters for the reading and/or writing operation.

The object of the present invention, therefore, is to propose a device having a simple structure and an appropriate method by means of which different types of optical recording media can be identified reliably yet rapidly.

This object is advantageously achieved by means of the measures specified in the independent claims. Advantageous developments of the invention are evinced in the subclaims. In order to achieve the object, the invention provides an identification means which makes it possible to determine the type of optical recording medium by assessing the physical properties thereof. This has the advantage that the scanning or recording properties of the device, which differ for different types of optical recording media, are automatically set in a manner corresponding to the determined type of recording medium.

According to the invention, the identification means is capable of determining the layer thickness of the protective layer which covers the recording layer of the recording medium. This has the advantage that it is thereby possible to use recording media having different layer thicknesses as well in the device according to the invention. Future recording media of high storage density will have smaller layer thicknesses than conventional recording media, for example than CDs.

According to the invention, provision is made for carrying out, during the focusing operation of the device according to the invention, a plausibility check of the signals determined from the reflected light. A plausibility check of this type has the advantage of managing essentially without any additional hardware elements, since it is possible to utilize functions and components which are present in any case. This plausibility check may consist, for example, in implementing different scanning or recording properties, suitable for different types of recording media, of the device with corresponding focus settings. Since the respectively set values are coordinated with different types of optical recording media, that is to say with optical recording media having different physical properties, the signals emitted by the detection means lie in a meaningful range of values only when the setting of the device is matched to the type of recording medium inserted. The type of optical recording media involved can be derived from that setting for which these signals are the most plausible.

A further aspect of the present invention provides for evaluating a plurality of characteristic features in the time characteristic of the intensity of the light reflected from the optical recording medium, for the purpose of determining the physical properties and hence the type of the optical recording medium. This measure is based on the insight that the time characteristic of the intensity depends on the type of optical recording medium. In this case, the time characteristic also includes reflections at the air-substrate material transition layer or at the transition layers of different layers of the optical recording medium, with the result that a relatively large number of information items are available for the evaluation. The time characteristic of the intensity of the reflected light differs, for example, for optical recording media having different thicknesses. Optical recording media which can be prerecorded or are prerecorded on both sides have, for each side, only about half the thickness of a conventional optical recording medium, for example of an audio CD. A distinction can likewise easily be made between different optical properties, for example different refractive indices of the substrate material of the optical recording medium and different reflectivities of the optical recording layers used, particularly when two or more layers of recording layers are arranged one above the other. In contrast to the prior art, in which a recording medium provided with two recording layers is determined only using the layer having the highest reflectivity, which can easily lead to incorrect assignment, such errors are virtually precluded with the device according to the invention. The light reflected from the optical recording medium is in this case detected by detection means. In the simplest case, the detection means consist of a photodetector, which emits an electrical signal proportional to the intensity of the light incident on it. In an advantageous development, the detection means are assigned a processing stage, in which the signal of the photodetector is processed and/or conditioned.

According to the invention, the signals emitted during the displacement of the focus point along the optical axis are evaluated. This has the advantage that it constitutes a simple measure which does not require any additional circuitry and time, since the focus point must in any case be moved towards the optical recording medium in order to find its correct position with reference to the recording medium.

According to the invention, the time intervals between the extreme values of the emitted signals are determined. This has the advantage that in this way the layer thickness or the distance between a plurality of layers that are present can be determined in a simple manner. Even greater accuracy of the assignment of the type of optical recording medium can be achieved if the magnitude of the extreme values of the emitted signals is additionally evaluated. In this case, it is possible just to determine the sequence and the magnitude of the extreme values or else additionally to take account of the time interval. The magnitude of the extreme values, which may be both maxima and minima, corresponds to the reflectivity of the corresponding recording layer. A comparison of the relative or else of the absolute magnitudes of the extreme values permits reliable identification of the different types of optical recording media.

Furthermore, the invention manifests the possibility of comparing the time characteristic of the intensity of the reflected signal with stored signal characteristics which are characteristic of the different types of optical recording media. Each of the stored characteristic signal characteristics is assigned the corresponding type of optical recording medium, with the result that the type of recording medium is determined using this comparison. In this case, the comparison is effected either directly or by means of a suitable mathematical algorithm.

In an advantageous development of the invention, the focusing means has a multiple-focus lens, in particular a dual-focus lens, as is provided for protective layers which have different thicknesses and cover the optical recording layer. This yields a relatively large number of extreme values in the time characteristic of the reflected signal. This has the advantage of enabling even more precise differentiation of this signal. The said dual-focus lenses have two different focal lengths or can be set to two different focal lengths, in order to be optically matched to two layers having different thicknesses. Optical matching to more than two different layers is achieved by a corresponding multiple-focus lens. It lies within the scope of the invention to use other suitable optical elements instead of a lens, which elements are capable of producing a plurality of focus points, such as holographic optical elements or polarizers, for example.

In order to identify the physical properties and hence the type of the optical recording medium, it is likewise possible to provide a switch, which can be actuated by the operator. This has the advantage that this measure which is particularly simple to realize is cost-effective to realize. The switch may be, for example, a mechanical switch, a touch-sensitive key, a contactless sensor or the like. A measure which enhances the operational convenience may be seen in the provision of a corresponding switch which is actuated by the optical recording medium or a cartridge connected thereto.

The settings of the devices according to the invention are advantageously altered by means of the method specified in the method claim, in order to be matched optimally to the type of recording medium.

The invention is described below using exemplary embodiments with reference to the figures. Advantageous developments of the invention can be found in the description.

Figure 1:
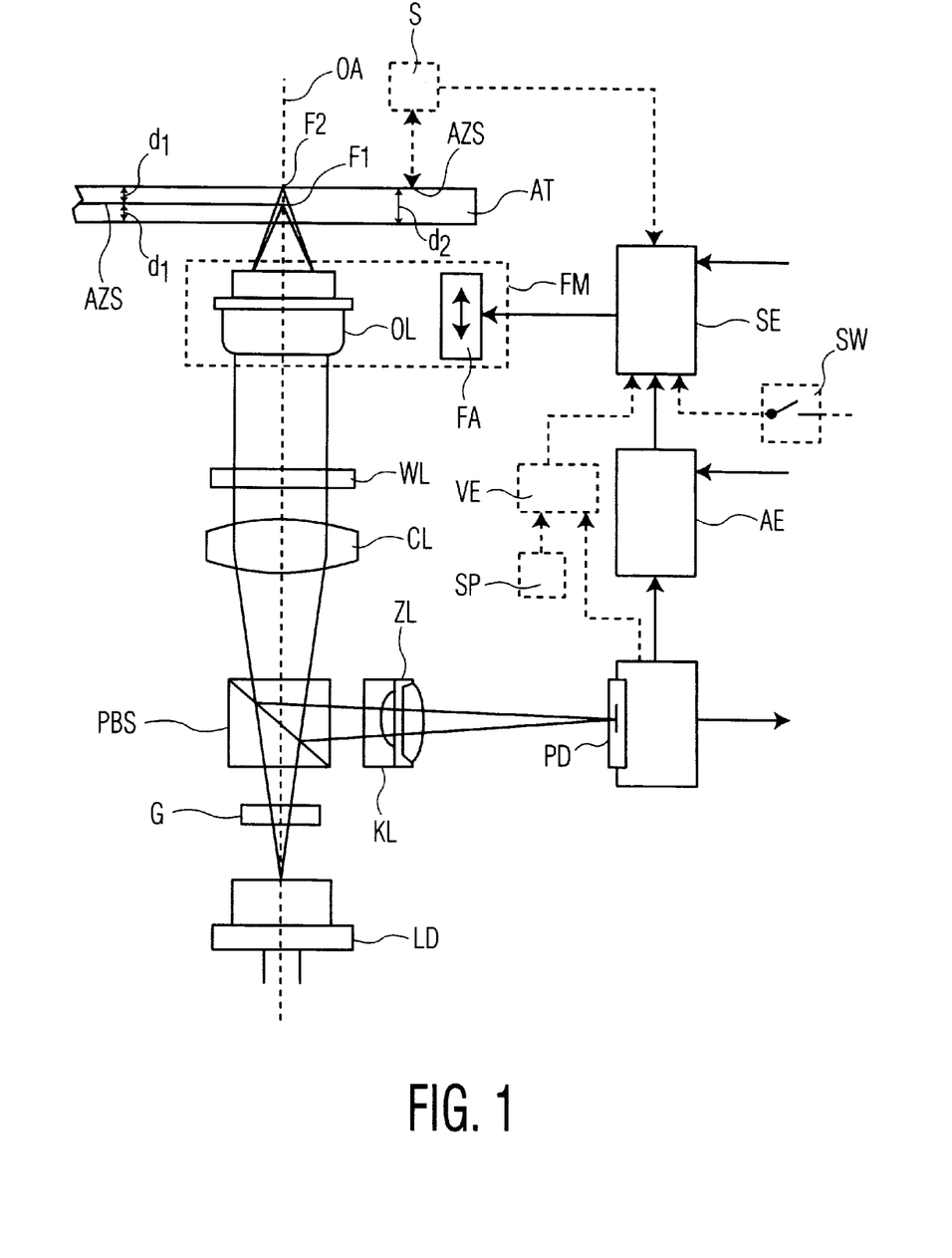
FIG. 1 shows a schematic sketch of a device according to the invention.

According to the schematic sketch, illustrated in FIG. 1, of a reproduction and/or recording device for optical recording media AT of varying storage density, a scanning device which, in accordance with FIG. 1, consists of a laser diode LD, a grating G, a polarization beam splitter PBS, a collimator lens CL, a quarter-wave plate WL, an objective lens OL, a concave lens KL, a cylindrical lens ZL and a detector PD is used in a reproduction and/or recording device which is provided both for playing back audio CDs and for playing back digital videodisks. Although the digital videodisks, called DVD below, and an audio disk, called CD below, have a different storage density, the scanning unit illustrated in FIG. 1 can be used equally for both types of recording media AT. The higher storage density of a DVD is achieved by a smaller pit size and a reduced track spacing in comparison with the CD. In order to reproduce the information stored on a recording medium AT or record corresponding information, it is necessary to adapt the diameter of the scanning beam or writing beam, respectively, to the size of the storage elements or pits, respectively, that are used. In order that both the smaller pits of a DVD and the larger pits of a CD can be read using the scanning device indicated in FIG. 1, the objective lens OL is designed as a dual-focus lens. The dual-focus lens or else a multiple-focus lens can be used to realize different light spot diameters on the information medium AT. This detector arrangement is advantageously used both for recording media AT of high storage density and of low storage density.

Output signals of the detection means PD are forwarded both for evaluation to known evaluation and regulating devices (not illustrated here) and to the evaluation unit AE, which can receive additional information from assemblies which are likewise not illustrated here. An output signal of the evaluation unit AE is forwarded to a control unit SE, which controls a focus drive EA as a function of signals from further assemblies (not illustrated here) such as a regulating device, for example. The said focus drive is part of the focusing means FM and, in the exemplary embodiment, serves to shift the objective lens OL along the optical axis OA. In the more general case, the focus point is shifted along the optical axis OA. The recording medium AT is illustrated with two different layer thicknesses d1 and d2. The layer thickness d2, which is illustrated on the right of the optical axis OA, corresponds to that of a conventional CD. The recording medium illustrated as an alternative on the left-hand side of the optical axis OA has two layers having the thickness d1. This is an example of a digital videodisk DVD which can be prerecorded or is prerecorded on both sides. The two focus points F1 and F2 and the objective lens OL, which is in this case designed as a dual-focus lens, are furthermore evident. The layer thickness d1, d2 is, as illustrated here using the example of the CD and the DVD, an indicator of the type of optical recording medium.

The illustrated device for playing back from and/or recording on the optical recording medium AT is capable of distinguishing between the different types of optical recording media such as CD and DVD, for example, in order that the control unit SE can drive the focus drive FA with control signals matched to the corresponding type of recording medium AT.

In the simplest exemplary embodiment, a sensor or mechanical switch SW, which can be actuated by the user of the device and is illustrated by dashed lines in FIG. 1, or a sensor S, which detects the type of recording medium AT and is likewise illustrated by dashed lines, is arranged here instead of the evaluation unit AE.

If mechanical switches are dispensed with, then it is necessary to generate in another way a signal by means of which the physical properties of the optical recording medium AT which is to be read from and/or written to can be identified, in order that the control unit SE can be set correspondingly.

This problem arises when the intention is to read from or write to conventional CDs in a device for reading from and/or writing to digital videodisks DVD. In order to manage with a read-out unit having a relatively simple structure despite the layer thickness differences d1, d2 of the different types of optical recording media, a dual-focus lens OL is used. In this case, each of the two focus points F1, F2 results in a light signal reflected from the recording medium. Only one of the two signals contains the stored information. Since the track width is different in a DVD and a CD, it is also necessary to match the tracking regulating circuit to the type of optical recording medium.

The optical recording media which are to be read from and/or written to may have height or distance deviations from the focusing means FM of up to several millimetres, whereas the focus point F1 or F2 is permitted to move away only by a few micrometres with regard to the recording layer AZS situated at the distance d1 or d2, respectively, from the underside of the optical recording medium AT. To this end, in the exemplary embodiment use is made of an automatic focusing system which regulates the distance between the objective lens OL and the recording layer AZS with the aid of the focus drive FA. The signals for controlling the focus drive FA are derived from signals emitted by the photodetector PD, that is to say parallel to the read-out of the information. The so-called astigmatism method can be used, for example, for focusing.

After the insertion of an optical recording medium into the device, the control unit SE first of all brings the distance between the objective lens OL and the recording medium AT into a position in which the focus point is situated on or in the vicinity of the recording layer AZS of the optical recording medium, with the result that the automatic regulating circuit, whose regulating range is limited, can be switched on. The operating range of the focus regulation is normally within the range from 10 to 100 micrometres, depending on the focusing method used.

In an initialization phase following the insertion of the optical recording medium AT into the device, the objective lens OL is usually moved at low speed in the direction of the recording medium AT. In a system having a conventional lens, that is to say a single focal point and, consequently, a single focus point, a narrow, pulse-like signal occurs when the focus point of the objective lens OL moves into the recording medium AT, and a further, significantly larger pulse occurs when the focus point, F2 impinges on the recording layer AZS. As long as the focus point is not situated in the vicinity either of the surface or of the recording layer AZS, virtually no reflected light falls onto the detector PD. If the focus point is situated just below a reflective surface, then a positive focus error signal FE is generated, for example, from the signals emitted by the detector PD, whereas this signal is negative as soon as the focus point is situated above the reflective surface. The value of the focus error signal FE is zero when the focus point is situated in a position suitable for writing or reading. The focus regulating circuit is usually switched on as soon as the focus error signal FE=0.

If, as illustrated in the exemplary embodiment, a dual-focus lens OL is used, then the number of pulses measured by the detector unit during initialization is doubled. Two pulses occur each time the focus points F1 and F2 pass through the air-recording medium interface and the recording layer AZS. This case is illustrated in FIG. 2 using a conventional CD.

Figure 2:
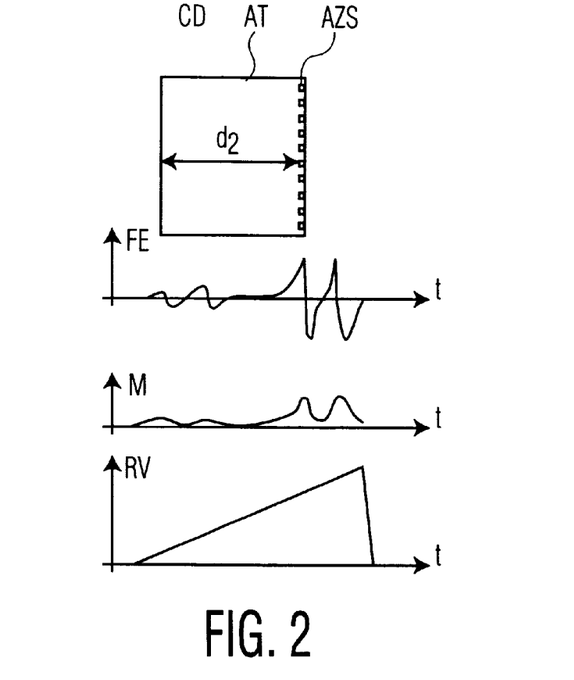
FIG. 2 shows a diagrammatic illustration of the determination of the type of optical recording medium by means of a dual-focus lens using a conventional CD.

The top part of FIG. 2 illustrates a detail of a recording medium AT, in this case a CD, which has been rotated through 90° in comparison with FIG. 1. The recording layer AZS is situated on the right-hand side, and the recorded information is illustrated by the elevations and depressions in the recording layer AZS. The bottom part of FIG. 2 illustrates the time axis t and the voltage RV which is output by the control unit SE to the focus drive FA during the initialization phase which has already been described above. The rising voltage RV causes the objective lens OL to move towards the recording medium AT. The signals emitted by the detector unit PD are likewise illustrated as focus error signal FE and as mirror signal M. The mirror signal M in this case corresponds to the mean intensity of the light reflected from the optical recording medium. This can be, for example, the envelope of the information signal.

For the exemplary embodiment, it is assumed that the dual-focus lens is designed in such a way that the intensity which can be measured at the focus point F2 is about half as high as that which can be measured at the focus point F1, which is provided for the read-out of the digital videodisk DVD. That part of the dual-focus lens OL which produces the focus point F2 is spherically corrected to a layer thickness of the recording medium AT of d2=1.2 mm, whereas that part of the dual-focus lens OL which produces the focus point F1 is corrected to a layer thickness of d1=0.6 mm, corresponding to the layer thicknesses of CD and DVD, respectively. As illustrated in FIG. 2, four pulses, also referred to below as peaks, occur for a CD while the objective lens OL is being moved towards the recording medium. In this case, the peaks of the mirror signal M are greatest when the focus error signal FE passes through a zero crossing directed from the positive to the negative range. The first peak occurs when the CD focus point F2 passes the surface of the recording medium. The intensity of the light reflected here is low, since the reflectivity of the surface is low, usually approximately 4%, and the focus point has large aberrations. The mirror signal M is therefore small. The second peak occurs when the DVD focus point F1 passes the substrate surface. In this case, too, the intensity of the reflected light and, therefore, also the peak in the mirror signal are low. To be precise, on account of the low reflectivity of the surface, on the one hand, and, on the other hand, on account of the fact that the spherical aberration for the focus point F2 is even higher than for the focus point F1, which is due to the higher numerical aperture. The third peak occurs when the CD focus point F2 reaches the recording layer AZS. The intensity of the light reflected here is high, since both the reflectivity of the recording layer AZS is very high, usually at least 70% for conventional CDs, and, on the other hand, only small aberrations occur. The corresponding peak is therefore likewise high. The fourth peak occurs when the DVD focus F1 impinges on the recording layer. Although the intensity of the light focused at the focus point F1 is about twice as high as that of the light focused at the focus point F2, in accordance with the assumption for this exemplary embodiment, the intensity of the light reflected here is about as high as that at the focus point F1, on account of the high aberrations.

Figure 3:
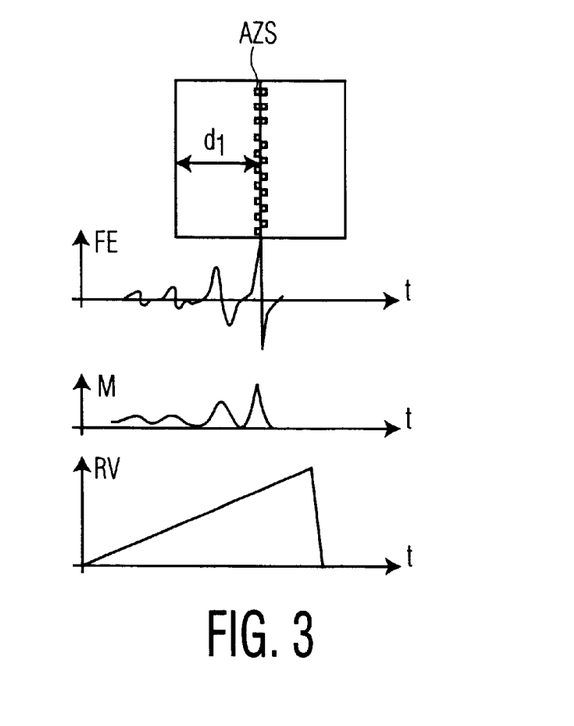
FIG. 3 shows a diagrammatic illustration of the determination of the type of optical recording medium by means of a dual-focus lens using an optical recording medium which is prerecorded or can be prerecorded on both sides, has a high storage density and has a single recording layer.

FIG. 3 illustrates a diagrammatic sectional view as well as the corresponding signal characteristics for a digital videodisk DVD having half the layer thickness d1. Four peaks occur in the mirror signal M in this case, too. The first peak occurs when the CD focus point F2 passes the surface of the recording medium. It is small on account of the low reflectivity and the large aberration. The same is correspondingly true for the second peak, which occurs when the focus point F1 passes the substrate surface. The third peak is produced when the focus point F2 impinges on the recording layer. The intensity of this peak is greater than those of the first two peaks, but is nevertheless relatively low on account of high aberrations of that part of the dual-focus lens OL which is corrected to a layer thickness d2 and produces the focus F2. The fourth peak occurs when the focus point F1 impinges on the recording layer. Since that part of the dual-focus lens OL which produces this focus point is corrected to the layer thickness d1 and double the intensity occurs at the focus point F1 when compared with the focus point F2, the fourth peak is about twice as high as the third peak.

Figure 4:
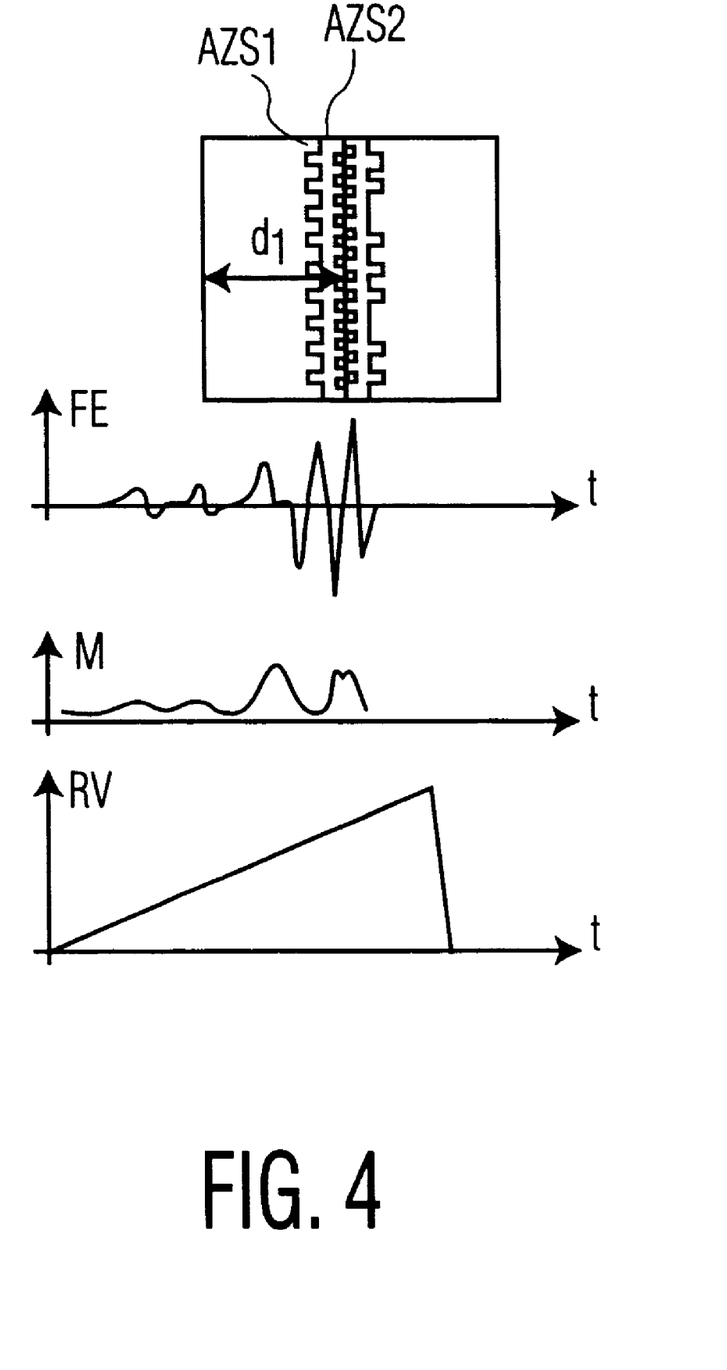
FIG. 4 shows a diagrammatic illustration of the determination of the type of optical recording medium by means of a dual-focus lens using an optical recording medium which is prerecorded or can be prerecorded on both sides, has a high storage density and has two recording layers.

FIG. 4 shows the signal characteristics and a sectional view for a digital videodisk having two recording layers AZS lying one over the other. The first two peaks in the mirror signal M correspond to those described with regard to FIG. 2 and to FIG. 3. The third peak occurs when the CD focus point F2 impinges on one or on the two recording layers. The peak in the mirror signal is greater here than the first peaks, but is nevertheless relatively small on account of high aberrations. If these aberrations are small enough, that is to say if the entire optical system, in particular the dual-focus lens OL, is correspondingly well corrected, it is possible to distinguish between two peaks. In the general case, however, these peaks will be superposed on one another in such a way that it is only possible to discern a widened peak, as illustrated in FIG. 4. When the DVD focus point F1 impinges on the first recording layer AZS1, the fourth peak is produced in the mirror signal M. Since the dual-focus lens OL has the smallest aberrations for the focus point F1 in combination with the substrate thickness d1 and double the intensity occurs at the focus point F1 when compared with the focus point F2, but the reflectivity of the first recording layer AZS1 is only in the region of 30%, the intensity of the light reflected here, and hence the height of this peak, is approximately as high as that of the third peak. An additional, fifth peak in the mirror signal occurs when the focus point F1 impinges on the second recording layer AZS2. The intensity of this peak is approximately of the order of magnitude of the preceding intensity. Although the fourth and the fifth peak are superposed on one another, they can nevertheless be discerned separately in the mirror signal. The distinction is made even more clearly in the focus error signal FE.

According to the invention, provision is made for measuring the intensity of each peak in the mirror signal M while the objective lens OL is moving up to the recording medium AT. The intensity at the instant of the positive-negative crossing of the focus error signal FE is taken in this case. The type of optical recording medium is determined from the time characteristic and/or the height distribution of the peaks. The decision-making process takes account of different properties of the optical recording medium, such as reflectivity of the corresponding reflective surface, reduced intensity modulation due to spherical aberration, time characteristic and the like.

In an idealized way of considering the exemplary embodiment, the speed of the objective lens OL can be determined from the time difference between the first two peaks and the known distance between the focus points F1 and F2. The layer thickness d1 or d2 can be inferred from the speed information and the time which elapses between the occurrence of the second and of the third peak, since this time is proportional to the thickness d1 or d2 divided by the difference between the two focus points (d2−d1). In this way, it is possible to determine the layer thickness d1 or d2 and thus the type of optical recording medium CD or DVD, respectively.

If the intensity distribution of the third and fourth or of the third to fifth peaks is used, then a conventional CD is concerned if the intensity difference between the third and the fourth peak is relatively small. If the fourth peak is substantially greater than the third peak, then a DVD having a single recording layer AZS is concerned. If the fourth peak is split into a fourth and fifth peak, then a DVD having two recording layers AZS1 and AZS2 is concerned. In this case, the third peak, too, may already be split. Multiple splitting of the third or fourth peak indicates a digital videodisk having a plurality of recording layers AZS1 to AZSn, where n corresponds both to the number of recording layers and to the number of splittings.

A further possible way of determining the type of optical recording medium is to store the signal characteristic, for example the time characteristic of the mirror signal M or of the focus error signal FE, for each possible type of recording medium in a memory unit SP. The stored signal characteristics are then compared with the currently measured signal characteristic in a comparison device VE, and the type of the actually inserted optical recording medium is determined on the basis of this comparison. In this case, it is possible to use a wide variety of mathematical methods to bring the time scale of the measured and of the stored curves into correspondence and to determine the largest possible correspondence between the curves. Fourier transformation and/or the convolution integral method can be used, for example, to determine a maximum.

The individual devices advantageously operate in the manner described below. To match the settings of a device for writing to and/or reading from an optical recording medium AT to the type of an optical recording medium AT, the following procedure is effected:

The focus point F1, F2 is shifted along an optical axis OA in accordance with device settings which are suitable for a first type of recording medium, the light reflected from the optical recording medium AT during this operation is detected and a signal which corresponds to the intensity of the reflected light is generated, a check is made to see whether this signal lies in a plausible value range and, if appropriate, the preceding step is repeated with settings which are suitable for a further type of recording medium; the settings which are suitable for that type of optical recording medium AT for which the signal lies in or the nearest to a plausible value range are then selected and the settings of the device are correspondingly matched.

Another method for matching the settings of a device for writing to and/or reading from an optical recording medium AT to the type of an optical recording medium AT comprises the following steps:

Shifting of a focus point F1, F2 along an optical axis OA and detection of the light reflected from the optical recording medium AT during this operation, determination of the type of optical recording medium AT using characteristic features in the time characteristic of the reflected light, and setting of the parameters of the device to values which are suitable for the determined type of optical recording medium AT. In this case, the differences between the extreme values of the time characteristic of the reflected light are determined for the purpose of determining the type of optical recording medium AT. Furthermore, in order to determine the type of optical recording medium AT, there is provision for comparing the relative and/or absolute values of the extreme values of the time characteristic of the reflected light with one another, or for comparing the time characteristic of the reflected light with stored reference time characteristics.

There is furthermore provision for using the MIRROR signal (M) or the focus error signal (FE) and/or a focusing means FM having different focus points F1, F2 for determining the time characteristic of the reflected light.

What is claimed is:

1. In a device for writing to or reading from different optical recording media, means for determining the type of optical recording medium in said device, said means comprising:
    an identification means which determines the layer thickness of said optical recording medium by determining the distance between two regions from a signal generated from reflected light; and
    an objective lens being moved to the recording medium at a constant speed; wherein
        said identification means determines said constant speed of said objective lens from a signal generated from said reflected light at said recording medium.

2. A device for writing to or reading from different optical recording media, comprising:
    focusing means for shifting a focus point along an optical axis;
    detection means for detecting light reflected from an optical recording medium;
    evaluation means for distinguishing the type of optical recording medium by evaluating signals emitted by said detection means; and
    a control unit for controlling said focusing means; wherein
        said evaluation means includes a plausibility checking unit, which checks said signals emitted by said detection means to determine if said signals are within a predetermined range, and wherein
        said control unit prescribes parameters corresponding to settings of said device which are suitable for a first type of recording media, and
        said evaluation means emits an output signal to said control unit for changing said parameters if said signals emitted by said detection means are not within said predetermined range.

3. The device according to claim 2, wherein:
    said evaluation means evaluates said signals emitted with said detection means while said focus point is shifted along said optical axis.

4. The device according to claim 2, wherein:
    said focusing means has a multiple-focus lens.

5. A device for writing to or reading from an optical recording medium, comprising:
    focusing means for shifting a focus point along an optical axis;
    detection means for detecting light reflected from said optical recording medium; and
    evaluation means for distinguishing the physical properties of said optical recording medium by evaluating time characteristics of a signal emitted by said detection means, wherein
        said time characteristics are determined by a combination of different signals.

6. The device according to claim 5, wherein
    said different signals are a focus error signal and a mirror signal.

7. The device according to claim 5, wherein:
    one of time acquisition means for determining a plurality of time intervals between extreme values of said emitted signal and magnitude acquisition means for determining the magnitude of a plurality of extreme values of said emitted signal is present.

8. The device according to claim 7, wherein:
    a sequence of one of said time intervals determined and said magnitudes determined is evaluated.

9. The device according to claim 5, wherein:
    said evaluation means evaluates said signal emitted with said detection means while said focus point is shifted along said optical axis.

10. The device according to claim 5, wherein:
    said focusing means has a multiple-focus lens.

11. A device for writing to or reading from an optical recording medium, comprising:
    focusing means for shifting a focus point along an optical axis;
    detection means for detecting the light reflected from the optical recording medium; and
    evaluation means for distinguishing physical properties of said optical recording medium by evaluating time characteristics of a signal emitted by said detection means; wherein
        at least one of relafive and absolute values of a plurality of extreme values of said signal are compared to one another.

12. The device according to claim 11, wherein:
one of time acquisition means for determining a plurality of time intervals between extreme values of said emitted signal and magnitude acquisition means for determining the magnitude of a plurality of extreme values of said emitted signal is present.

13. The device according to claim 12, wherein:
a sequence of one of said time intervals determined and said magnitudes determined is evaluated.

14. The device according to claim 11, wherein:
said evaluation means evaluates said signal emitted with said detection means while said focus point is shifted along said optical axis.

15. The device according to claim 11, wherein:
said focusing means has a multiple-focus lens.

16. A device for writing to or reading from an optical recording medium, comprising:
focusing means for shifting a focus point along an optical axis;
detection means for detecting the light reflected from the optical recording medium; and
evaluation means for distinguishing physical properties of said optical recording medium by evaluating time characteristics of a signal emitted by said detection means; wherein
said focusing means has at least two beam paths which are optically corrected differently and whose signal characteristics with respect to time are evaluated jointly.

17. The device according to claim 16, wherein:
one of time acquisition means for determining a plurality of time intervals between extreme values of said emitted signal and magnitude acquisition means for determining the magnitude of a plurality of extreme values of said emitted signal is present.

18. The device according to claim 17, wherein:
a sequence of one of said time intervals determined and said magnitudes determined is evaluated.

19. The device according to claim 16, wherein:
said evaluation means evaluates said signal emitted with said detection means while said focus point is shifted along said optical axis.

20. The device according to claim 16, wherein:
said focusing means has a multiple-focus lens.

21. A device for writing to or reading from an optical recording medium, comprising:
focusing means for shifting a focus point along an optical axis;
detection means for detecting the light reflected from the optical recording medium;
evaluation means for distinguishing the physical properties of the optical recording medium by evaluating a plurality of time related characteristics of a signal emitted by said detection means;
a memory device for storing signal characteristics emitted by said detection means, which characteristics are caused by the different types of optical recording media; and
a comparison device which compares a measured signal characteristic with said stored signal characteristics to determine which type of optical recording medium is present.

22. The device according to claim 21, wherein:
said evaluation means evaluates said signal emitted with said detection means while said focus point is shifted along said optical axis.

23. The device according to claim 21, wherein:
said focusing means has a multiple-focus lens.

24. A method for changing settings for shifting a focus point of a device for writing to or reading from an optical recording medium in accordance with the physical properties of the optical recording medium, comprising the following steps:
inserting said recording medium into said device;
shifting of said focus point along an optical axis in accordance with predetermined settings of said device which are matched to a first type of recording media;
detecting light reflected from said optical recording medium during said shifting step;
generating a signal from said detecting step which corresponds to said reflected light intensity;
determining at least one of relative value and absolute value of a plurality of extreme values of said signal;
determining time intervals between said extreme values of said signal;
comparing said extreme values and relative intervals between said extreme values;
determining settings which are suitable for physical properties of said inserted recording medium on the basis of the comparison; and
changing of said settings for shifting said focus point of said device to said determined settings.

* * * * *